（12） United States Patent
Conde et al.

(10) Patent No.: US 7,302,142 B2
(45) Date of Patent: *Nov. 27, 2007

(54) METHOD AND DEVICE FOR ASSEMBLING OPTICAL COMPONENTS OR AN OPTICAL COMPONENT AND A SUBSTRATE

(75) Inventors: Ramiro Conde, Savigny (CH); Christian Depeursinge, Preverenges (CH)

(73) Assignee: Andromis S.A. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/123,176

(22) Filed: Apr. 17, 2002

(65) Prior Publication Data

US 2002/0118908 A1    Aug. 29, 2002

Related U.S. Application Data

(62) Division of application No. 09/147,235, filed as application No. PCT/EP98/01292 on Mar. 2, 1998.

(60) Provisional application No. 60/039,849, filed on Mar. 4, 1997.

(51) Int. Cl.
  *G02B 6/30*  (2006.01)
(52) U.S. Cl. .......................... 385/49; 385/33
(58) Field of Classification Search .......... 385/33, 385/46, 47, 49; 65/40; 148/DIG. 12; 156/273.9; 174/52.3; 428/427, 428
See application file for complete search history.

(56) References Cited

U.S. PATENT DOCUMENTS 3,506,424 A * 4/1970 Pomerantz ............... 65/40
4,743,567 A * 5/1988 Pandya et al. ............ 117/43
4,869,572 A   9/1989 Despouys
4,902,426 A   2/1990 Macedo et al.
4,958,905 A * 9/1990 Tynes et al. ........... 350/96.21
5,117,473 A   5/1992 Pan
5,208,885 A   5/1993 Dragone et al.
5,500,917 A   3/1996 Daniel et al.
5,682,453 A   10/1997 Daniel et al.

(Continued)

FOREIGN PATENT DOCUMENTS

AU    1612195 A    10/1995

(Continued)

OTHER PUBLICATIONS

Patent Abstracts of Japan, vol. 010, No. 380 (P-528), Dec. 19, 1986 & JP 61 170706 A (Olympus Optical Co. Ltd.), Aug. 1, 1986.
Patent Abstracts of Japan, vol. 012, No. 299 (C-520), Aug. 15, 1988 & JP 63 069734 A (Fujitsu Ltd.) Mar. 29, 1988.

(Continued)

*Primary Examiner*—Joshua L Pritchett
(74) *Attorney, Agent, or Firm*—Lerner, David, Littenberg, Krumholz & Mentlik, LLP

(57) ABSTRACT

An optical assembly includes an optical component, a substrate, and a thin glass layer located at the interface between the optical component and the substrate. The substrate can be a metal, a semiconductor, a plastic, a shape memory material, or a metal layer deposited on a shape memory material element. The optical component can be an optical fiber having a single core or a multicore optical fiber. The optical component can be a lens and the substrate can be a tube.

46 Claims, 5 Drawing Sheets

U.S. PATENT DOCUMENTS 6,360,039 B1 * 3/2002 Bernard et al. ............... 385/33
6,453,090 B1 * 9/2002 Conde et al. ............... 385/33

FOREIGN PATENT DOCUMENTS

| AU | 4760897 A | 2/1998 |
|---|---|---|
| AU | 691874 B | 5/1998 |
| CA | 2147070 A | 10/1995 |
| EP | 0 678 486 A | 10/1995 |
| JP | 6003558 A | 1/1994 |
| JP | 8043672 A | 2/1996 |

OTHER PUBLICATIONS

Patent Abstracts of Japan, vol. 010, No. 036 (C-328), Feb. 13, 1986 & JP 60 186444 A (Canon KK), Sep. 21, 1985.

Database WPI, Section Ch, Week 9110, Derwent Publications Ltd., London, GB; Class L01, AN 91-071618 XP002033272 & SU 1 557 119 A (Lengd Kalinin Poly), Apr. 15, 1990.

Patent Abstracts of Japan, vol. 012, No. 140 (P-696), Apr. 28, 1988 & JP 62 262808 A (Furukawa Electric Co. Ltd:The), Nov. 14, 1987.

Patent Abstracts of Japan, vol. 004, No. 090 (P-017), Jun. 27, 1980 & JP 55 053302 A (Toshiba Corp), Apr. 18, 1980.

Patent Abstracts of Japan, vol. 018, No. 387 (P-1773), Jul. 20, 1994 & JP 06 109944 A (Sumitomo Cement Co, Ltd), Apr. 22, 1994.

Patent Abstracts of Japan, vol. 007, No. 146 (P-206), Jun. 25, 1983 & JP 58 058513 A (Nippon Denshin Denwa Kosha), Apr. 7, 1983.

Patent Abstracts of Japan, vol. 095, No. 004, May 31, 1995 & JP 07 005307 A (Canon Inc), Jan. 10, 1995.

Lawrence K. Altman and Denise Grady, "Hospital Says Faulty Recall May Have Exposed 400 to Infection," The New York Times, Mar. 5, 2002.

La Ministre de l'emploi et de la solidarité, Le Minsitre déléguéà la santé Circulaire No. DGS/5C/DHOS/E2/2001/138, Mar. 14, 2001 (with partial English translation).

* cited by examiner

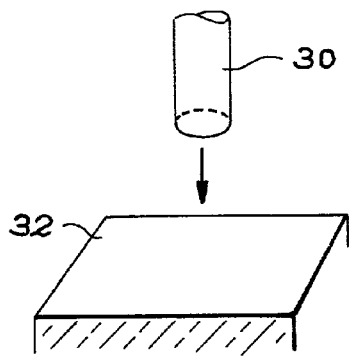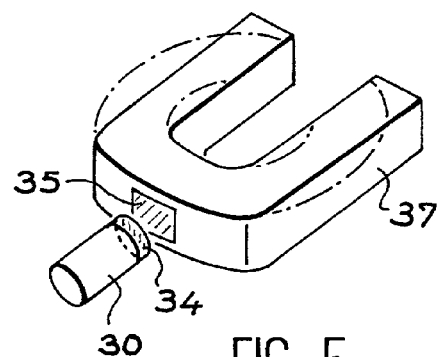
FIG. 3                FIG. 5
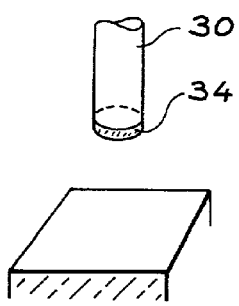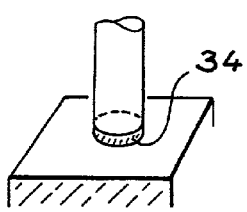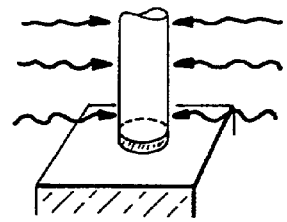
FIG. 4A          FIG. 4B          FIG. 4C
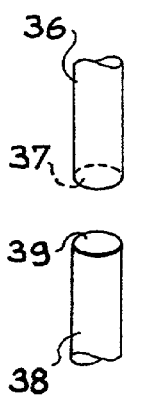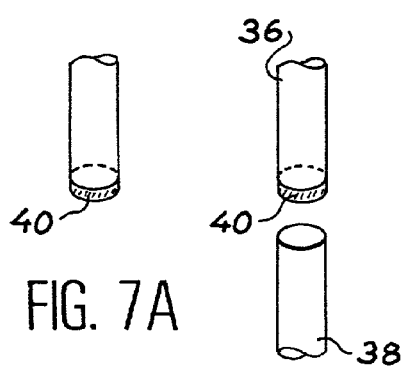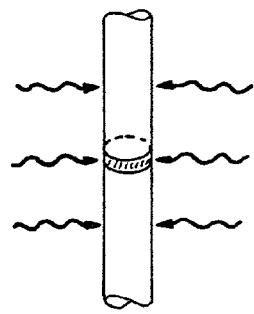
FIG. 6          FIG. 7B          FIG. 7C
FIG. 7A

METHOD AND DEVICE FOR ASSEMBLING OPTICAL COMPONENTS OR AN OPTICAL COMPONENT AND A SUBSTRATE

CROSS-REFERENCE TO RELATED APPLICATIONS

This application is a division of Application No. 09/147,235 filed Jun. 28, 1999, the disclosure of which is hereby incorporated by reference herein. Application Ser. No. 09/147,235 is a national phase entry under 35 U.S.C. § 371 of International Application No. PCT/EP98/01292 filed Mar. 2, 1998, which claims the benefit of the filing date of U.S. Provisional Application No. 60/039,848 filed Mar. 4, 1997.

BACKGROUND OF THE INVENTION

1. Field of the Invention

The invention relates to the assembly or splicing between two optical components, particularly an optical fiber and another optical component, whereby the latter can e.g. be another optical fiber (particularly a multicore fiber) or a lens or microlens (particularly a graded-index or GRIN lens). The optical fiber can also be a multicore fiber. Another example of an optical element which can be assembled or spliced with the aid of the invention is a lens-prism assembly. The invention also relates to the assembly of an optical component and a substrate, e.g. a semiconductor or metal substrate. The component can e.g. be an optical fiber or a lens.

2. Discussion of the Background

The article by K. Kinoshita entitled "End preparation and fusion splicing of an optical fiber array with $CO_2$ laser" published in Applied Optics, vol. 18, No. 19, pp 3256-3260, 1979 describes the fusion of optical fibres with the aid of a $CO_2$ laser. The article by K. Egashira entitled "Analysis of thermal conditions in $CO_2$ laser splicing of optical fibers" published in Applied Optics, vol. 16, No. 10, pp 2743-2746, 1977 also relates to fiber-fiber splicing using a $CO_2$ laser.

The article by K. Nakatate et al entitled "Silica based rod lens for the medical fiberscope" published in Proceedings SPIE, 1994 relates to a fiber-lens bonding. It uses a technology identical to that of fiber-fiber fusion using an electric arc. It involves a meeting of the surfaces to be contacted.

This procedure is only applicable to small diameter optical elements (less than 200 μm). Microlenses are produced using the same procedures as those used for producing the optical fibres. Thus, the glasses obtained for the lenses melt at temperatures comparable with the fiber fusion temperatures, which obviously makes fusion or welding easier. Consequently, this procedure cannot generally be applied to the production of an assembly of two random optical components.

In general terms, all these procedures lead to a deformation of the contacting surfaces by heating. In the case of fiber-fiber splicing, fusion leads to a deformation of the end of the fused together fibres. Moreover, in general, the optical fibres are prepared beforehand by cleaving, but the perpendicularity of the interface with respect to the fiber axis is not guaranteed in this procedure. Thus, fusion requires a plastic deformation obtained by exerting an axial pressure.

A known method for assembling two random optical components, e.g. a lens and a prism, involves bonding. However, bonding is chemically sensitive to certain solvents and leads to a poor mechanical strength for small surfaces. It also requires the introduction of a material (the adhesive), which reduces the optical quality of the path which can be followed by a beam. Bonding is more particularly used for the assembly of a lens and a multicore fiber with a view to the preparation of microendoscopes.

Endoscopy and in particular microendoscopy enables a medical practitioner to acquire information or images of internal parts of the human body, such as the stomach, lungs, heart, blood vessels or eye.

An apparatus for performing such a procedure is diagrammatically shown in FIG. 1, where reference 2 designates a light source focused by a lens 4 at the entrance end of a light guide 6. The latter is usually connected to a plurality of optical fibres 8, 10 located on the periphery of a multicore fiber 12. Thus, an illuminating beam 14 can be directed onto an area 16 of an organ to be observed, which reflects radiation 18 onto a lens 20 connected to the entrance end of a multicore fiber 12. As the latter has a coherent bundle of individual cores, the latter consequently transmit the light in an ordered manner between them and the image obtained at the exit end 22 of the multicore fiber corresponds to the image formed at its entrance end. Means for storing, analyzing and/or representing the image can also be provided in combination with this apparatus.

This imaging procedure is e.g. described in the articles by A. Katzir: "Optical fibers in medicine", Scientific American, vol. 260 (5), pp 120-125, 1989 and "Optical fiber techniques (medicine)", Encyclopedia of Physical Science and Technology, vol. 9, pp 630-646, 1987.

FIG. 2 illustrates the presentday production of the lens-multicore fiber assembly. A metal tube 24 maintains the lens 20 in front of the multicore fiber 12 and an adhesive 26 ensures the optical continuity and prevents the lens from passing out of the tube 24. This procedure gives good results, but has the disadvantage of requiring difficult manipulation, of reducing the optical quality by introducing a supplementary medium 26 between the lens and the multicore fiber and of making the endoscope very vulnerable to the necessary heating-based sterilization stages. Moreover, bonding takes place blind in the tube 24 and without any accurate control. In view of the tolerances of the tube, the bonding action is random and very variable.

In general terms, the assembly or splicing of two optical components or an optical component and a substrate by bonding also suffers from a certain fragility and is not compatible with high or very high temperature uses, particularly when a sterilization is necessary.

U.S. Pat. No. 5,208,885 describes a process for producing a connection between a waveguide on a substrate and an optical fiber. A glass paste, whose melting point is lower than the temperature to which the waveguide can be heated is applied to the optical fiber and/or to the waveguide. The glass paste is heated in order to bring about the connection between the fiber and the waveguide.

More specifically, the glass can consist of a borosilicate-aluminium-lead mixture and heating can be brought about using a laser, e.g. a $CO_2$ laser or an excimer laser.

The procedure described in this document does not solve the optical problems, i.e. the optical deterioration and disturbance to the beam when the latter has to traverse the glass connection. The implementation of this procedure with a view to producing an imaging device, e.g. an endoscope is consequently impossible. Moreover, the application given relates to a weld between materials (made from glass) having similar compositions ($SiO_2$/Si substrate with a weakly doped $SiO_2$ fiber) melting at high temperatures, which provides the choice for the weld of multiple glass compositions melting at lower temperatures, as well as different production procedures.

The material adopted in said document for the weld (glass paste) is difficult to dose due to the evaporation of the binder, which considerably modifies the volume thereof.

The paste can also undergo chemical deteriorations making it inappropriate for use in optics. Moreover, the homogenization necessary for reducing diffusion involves a temperature rise up to 1000° C., which is unacceptable when certain optical components have to be contacted or welded to one another.

Finally, the use of glasses melting at low temperatures is not necessarily an advantage if their optical properties (refractive index) and thermal properties (expansion) are too different from those of the optical elements. For example, the respective expansion coefficients of a multicore fiber and a lens are respectively $5.10^{-7}$ and $100.10^{-7}$.

Finally, for the implementation described in said document (plunging the end of a fiber in a glass bath) does not make it possible to carry out a precise check on the deposited glass quantity, or on the alignment of the elements to be welded prior to the melting of the layer. This procedure also involves a good wettability.

EP-678 486 (Gould Electronics) describes a process for producing a bond or a lateral coating or covering between glass-based components.

The assembly is obtained with the aid of a glass-based composition, which is heated, e.g. with the aid of a $CO_2$ laser or an electric arc. The wettability properties of the surfaces are essential to the assembly.

Here again, the document does not refer to the question of the optical transmission of the materials used. Deterioration to optical properties can occur, e.g. due to:

the stressing of a fiber, which can lead to refractive index variations, thereby disturbing the propagation of the signal, optical absorption by lead glasses, which can produce an attenuation or colouring of the signal, particularly under the influence of X-rays (e.g. in the case of use of an endoscope), the presence of residues of the binder in the case of glass pastes, or inhomogeneities, which can produce diffusion.

Thus, the connection described in this document is inappropriate for producing an imaging device, particularly an endoscope. In addition, there again, the application provided relates to the joining of elements which are similar to one another with regards to their compositions and which melt at high temperatures, which offers the choice for numerous glasses melting at low temperatures. Finally, the procedure adopted in this document does not make it possible to precisely check the deposited glass quantity or the alignment of the elements to be welded.

In addition, none of the procedures described hereinbefore is appropriate for producing assemblies of very different materials, e.g. an optical component and a shape memory, plastic, semiconductor or metal substrate. However, a lens-metal tube assembly is used, e.g. in rigid endoscopes.

Another example of such an assembly is that of a shape memory material and an optical component, e.g. an optical fiber.

The only known method making it possible to produce such assemblies is that of bonding, which suffers from the disadvantages referred to hereinbefore (lack of stability of certain solvents, poor mechanical strengths for small surfaces, introduction of a material (the adhesive) which disturbs the optical beams or reduces the optical quality of the path to be followed by a beam). It is therefore desirable to find an assembly procedure making it possible to reduce the optical disturbance between the two elements to be assembled.

The known methods also do not permit the effecting of a precise adjustment of the surfaces to be contacted.

Finally, in the case of a metal-glass weld, conventional welding methods do not make it possible to eliminate deformations of the glass.

SUMMARY OF THE INVENTION

The first object of the invention is a process for assembling an optical component and a substrate, which makes it possible to avoid the disadvantages described hereinbefore.

The invention firstly relates to a process for the assembly of an optical component with a substrate comprising:

a first stage of depositing a glass layer on at least one of the two faces or surfaces to be contacted, a second stage of contacting the two faces or surfaces, a third stage of heating the glass, leading to a weld between the optical component and the substrate.

The invention also relates to a process for the assembly of two optical components making it possible to avoid the disadvantages referred to hereinafter and which can in particular be applied to the implementation of imaging devices, e.g. endoscopes.

The invention therefore also relates to a process for the assembly of a first and a second optical components comprising:

a first stage of depositing a glass layer on one of the two faces or surfaces to be contacted, a second stage of contacting the two faces or surfaces, a third stage of heating the glass leading to a weld between the two optical components.

In both cases, the weld or brazed joint obtained has a high mechanical strength and a good thermal behaviour.

In addition, in both cases, the glass layer is deposited on the active face or faces of the optical component or components, i.e. on the face or faces to be traversed by radiation.

The glass layer is also deposited in situ, without requiring subsequent spreading during assembly. The wettability of the surfaces to be contacted is therefore not essential to the process according to the invention.

The use of a thin glass layer (layer with a thickness between 0.1 and 10 μm) for the weld makes it possible to reduce or avoid parallelism problems between the faces or surfaces to be contacted and avoids deformation of said faces or surfaces. A thin glass layer also does not reduce the optical quality of the components, unlike in the case of an adhesive layer or a drop of glass paste. In particular, the thin layer does not or only slightly disturbs an optical beam traversing it, which is the case when it is e.g. located at the junction of two optical fibres.

Such a glass layer can be used for bonding or welding very different materials. In particular, the process according to the invention is particularly readily applicable to the production of assemblies of optical components, or an optical component and a substrate, having different or very different thermal expansion coefficients. For the glass of the thin layer a choice will then be made of a composition having an expansion coefficient intermediate between those of the components.

In the case of an optical component-substrate bond, the latter can be metallic, plastic, semiconductor or shape memory or can be a metal layer deposited on a shape memory substrate, the optical component then e.g. being a single core optical fiber or a multicore optical fiber. Finally, the substrate may or may not be flat. Thus, it is possible to produce a metal tube-lens assembly of the type used in conventional endoscopy. The invention also relates to an endoscope implementing such an assembly.

In the case of two optical components, one of the two components can be an optical fiber having a single core or can be a multicore fiber, the second optical component being e.g. an optical fiber (once again with a single core or multicore) or a microlens (e.g. a GRIN lens). In addition, the first and/or second optical components can in each case be a lens or a prism.

Moreover, the process according to the invention makes it possible to weld optical components having a random size or diameter, below or above 200 µm.

Another advantage of the glass layer is that as a result of its ductility it absorbs part of the mechanical tensions linked with possible respective expansions of the components. Thus, the final assembly does not suffer from mechanical stresses, which can be encountered in components directly assembled by laser fusion.

Thus, as a result of the glass layer, it is possible to bring about a precise adjustment of the surfaces to be contacted.

In the case of two optical components, an adjustment of the positioning of one element relative to the other can take place prior to heating through the use of the thin layer. The use of a droplet of adhesive, as in U.S. Pat. No. 5,208,885, does not make it possible to carry out an adjustment prior to the liquefaction of the intermediate glass.

The adjustment of the positioning can also take place during heating with the aid of optical control means.

In particular, when one of the optical components is a multicore fiber, it is possible to carry out a control or check by an interferometric device. The image of the fringes is transmitted by the multicore fiber.

It should be noted that the glass layer is produced on the optically active part of the system. Preferably it does not contain lead, which can oxidize.

The use of a thin glass layer is also of interest for the following reason. A thin layer has a lower glass transition point than the melting point of the same material in the form of a macroscopic volume. Thus, there is a low temperature melt, which is advantageous with respect to the optical component or components to be assembled, which could be deteriorated by an excessive temperature rise.

The thinness of the layer makes it possible to separate the welding properties from the melting properties. A progressive softening of the layer takes place during heating, which permits an adjustment of the surfaces. The temperature is increased in order to make the actual weld, which is linked with the activation energies at the interfaces between the elements present. Thus, preferably a two-stage heating is used. A first stage makes it possible to reach the softening point of the thin layer. In a second stage the temperature is raised to an adequate value to make the actual weld. Said second stage can be brief (e.g. a few minutes or less).

The heating stage can e.g. take place by electric arc or filament (operating by the Joule effect) or by laser. Laser heating is better temperature-controlled. In the case of a laser and for an optical fiber-optical component or optical fiber-substrate assembly, it can be of interest to arrange the laser beam and fiber-component or fiber-substrate assembly in such a way that, at the laser beam impact point, the said beam is displaced to the side of the optical fiber. In this way the absorption and conductivity of the fiber are combined. Thus, the heated volume is displaced to the side of the latter and the heating either does not affect or only slightly affects the substrate or component. As a function of the nature of the latter, a displacement by a distance, measured between the centre of the beam and the end of the fiber, between a few and a few hundred micrometers (e.g. between 50 and 200 µm or 300 µm, or between 90 and 170 µm) can be appropriate.

Compared with other methods (electric arc, filaments), laser heating has the advantage of offering a considerable adaptability. The focusing and size of the beam are adaptable to the type of surface or object to be welded.

It is possible to preheat the thin layer in order to increase its adhesion without deforming it. This preheating stage can be performed prior to the contacting of the substrate and the optical component or element, or the optical components or elements with one another. It makes it possible to reinforce the bond (combination of covalent and ionic bonds) between the glass layer and the surface on which it is deposited, which then aids the actual welding.

Preferably, the glass used is an evaporatable glass which, during its evaporation, retains the same chemical composition and same physical properties as the original material.

For the glass layer it is possible to choose a glass with a glass transition point between 400 and 600° C., or between 400 and 500° C., e.g. a glass incorporating a silica matrix doped with sodium and boron, e.g. also a silica matrix doped with a $B_2O_3$—$Al_2O_3$—$Na_2O$—$K_2O$ mixture. Germanium-doped glasses also have a low glass transition point. Thus, the glass transition takes place at relatively low temperatures compared with the critical temperatures of most optical components, e.g. optical fibres having one or more cores. In the case of optical components having a certain fragility with respect to thermal shocks or a thermal deformation risk of the index profile (e.g. GRIN lens used in endoscopy), this point can be important.

The invention also relates to an assembly of an optical component and a substrate having, apart from the component and the substrate, a glass layer located at the component-substrate interface.

The invention also relates to an assembly of two optical components having, apart from the two components, a thin glass layer located at the interface between these two components.

As has been explained hereinbefore, the substrate can be metallic, semiconductor, plastic or shape memory type and the optical component or components can be optical fiber or fibres having a single or several cores, or can be a microlens (GRIN) or a lens or even a prism. The glass can be an evaporatable glass, as defined hereinbefore. The invention also relates to an endoscope having a multicore fiber and a lens fixed to the end of the fiber by means of a glass layer located at the lens-fiber interface.

The invention also relates to an endoscope having a multicore fiber, a lens connected to said multicore fiber, means for illuminating an area to be observed, the connection between the lens and the fiber being constituted by a material able to withstand the sterilization temperature and the humid heat of an autoclave.

The lens-fiber connection is e.g. brought about by a thin glass layer according to one or other of the embodiment described hereinbefore.

BRIEF DESCRIPTION OF THE DRAWINGS

The features and advantages of the invention can be better gathered from the following description. This description relates to embodiments given in an explanatory and non-limitative manner and with reference to the attached drawings, wherein show:

FIG. 3 A fiber and substrate to be spliced.

FIGS. 4A-4C Stages in a fiber-substrate assembly or splicing process according to the invention.

FIG. 5 An example of the assembly of an optical component with a metal layer deposited on a shape memory material.

FIG. 6 Two fibres to be assembled by a process according to the invention.

FIGS. 7A-7C Stages in the assembly of two fibres according to the invention.

DETAILED DESCRIPTION OF THE PREFERRED EMBODIMENTS

Figure 1:
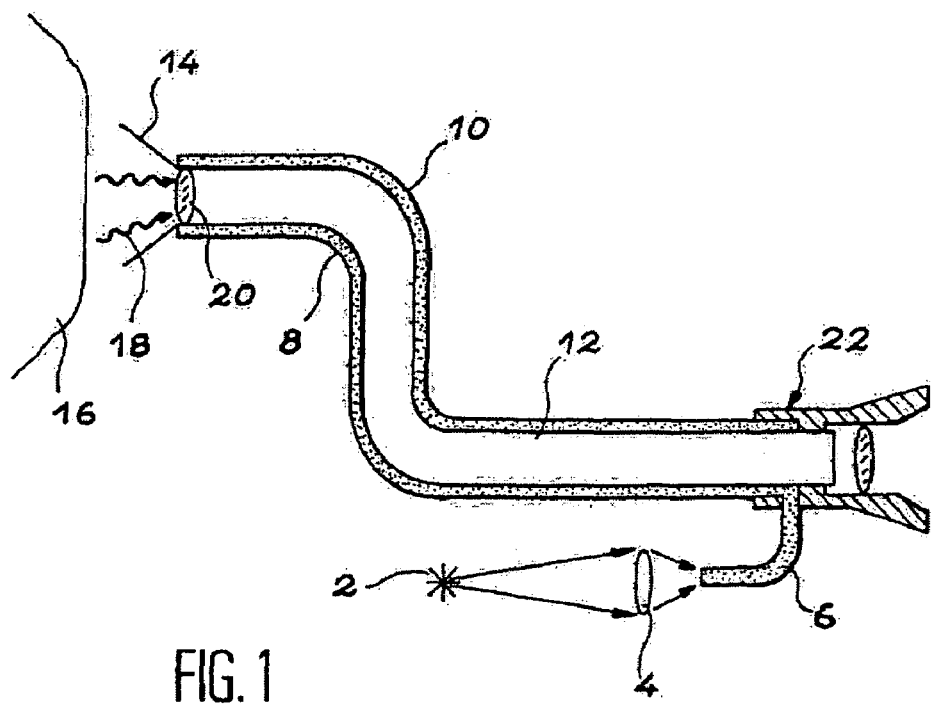
FIG. 1 Diagrammatically an endoscope.
Figure 2:
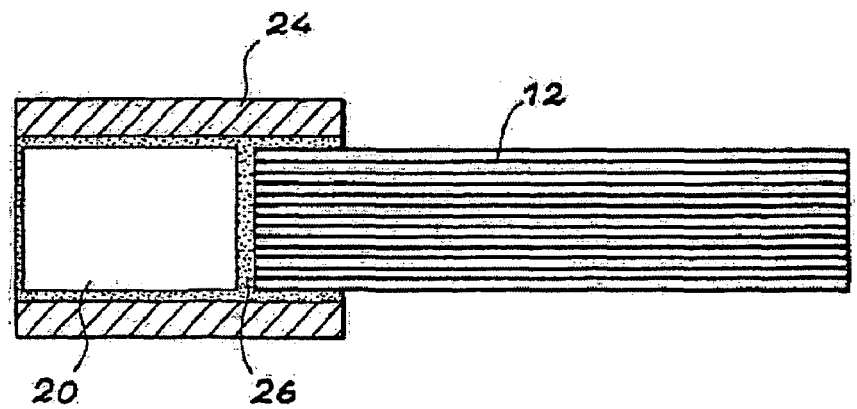
FIG. 2 In greater detail, the multicore fiber-lens connection of a prior art endoscope.

FIG. 3 shows an optical fiber, e.g. having a single core (compatible with use in optical communications) or a multicore fiber. This fiber 30 is to be spliced with a substrate 32, e.g. a metal substrate or a semiconductor substrate (e.g. of silicon, GaAs, etc.).

For this purpose, firstly on the end of the fiber 30 is deposited a glass layer 34 (FIG. 4A). An evaporatable glass is preferably chosen. The glass layer can be deposited by plasma (pulse). It can also be deposited by evaporation, e.g. from a glass target bombarded by an electron beam. The control of the evaporation time makes it possible to control the thickness of the layer. A thin layer with a thickness equal to or less than a few micrometers or 10 µm, e.g. equal or substantially equal to 1 or 2 or 3 or 5 µm or a few tenths of micrometers, e.g. 0.1 µm can be suitable. Thus, the layer obtained is evaporated in molecular form.

For glass layer deposition it is also possible to use the known spin-on-glass methods, which are used in the microelectronics field. Silica glass is generally mixed with organic solvents and then, after heating to typical temperatures of approximately 500° C. for periods of typically a few hours, an extremely resistant glass layer is obtained. It is then possible to deposit a layer on the surfaces, followed by centrifuging to obtain a flat layer of defined thickness (the thickness values are those given hereinbefore). Annealing then produces the glass layer with good characteristics. The layer obtained contains no binder which it would then be necessary to eliminate during a subsequent stage.

The fiber, provided with its glass layer is then brought into contact with the surface 32 (FIG. 4B). A precise positioning can be brought about as a result of the thinness of the glass layer and the absence of binder to be eliminated. As from its deposition, it is in a quasi-definitive form.

This is followed by a heating stage (FIG. 4C), which can be carried out by laser, electric arc, or filaments would in turns on a cylinder with a diameter larger than the diameter of the elements to be assembled, or by any other known heating method making it possible to reach the glass transition point of the glass. After cooling, the fiber-substrate assembly is strongly assembled. The laser heating method is the most adaptable for each particular case.

According to a variant, the elements and in particular the fiber 30 and glass layer 34 are heated prior to the actual assembly, which favours ion exchanges with the assembly.

The invention also relates to the assembly of a random optical component and a substrate which is not necessarily planar. For example, the invention can be applied to a lens to be fixed in a metal tube. Such an assembly is used in rigid endoscopes for medical or industrial purposes. The invention then makes it possible to locate the lens in a random position with respect to the substrate. Assembly takes place in the aforementioned manner: an evaporatable glass layer is deposited on one of the surfaces to be assembled and then the two surfaces are brought into contact with one another, the glass layer being located at the interface. Heating takes place by laser or electric arc or by filaments wound in turn form onto a cylinder with a diameter larger than the diameter of the elements to be assembled, or by any other known heating method making it possible to reach the glass transition temperature of the glass.

Another example of assembly to which the invention applies involves the assembly of an optical component with a shape memory material or a material deposited on a shape memory material. Thus, as illustrated in FIG. 5, it is possible to deposit a metal layer 35 on an element 37 (having the shape indicated in continuous line form or the more curved shape indicated in broken line form) of a memory material (e.g. a NiTi or CuZnAl or NiTiCu alloy).

An optical fiber 30 is welded to the metal layer by the procedure described hereinbefore. On the end of the fiber 30 is firstly deposited a glass layer 34 (evaporatable glass deposited by evaporation from a target bombarded by an electron beam). The fiber with its glass layer is then brought into contact with the metal, followed by heating (laser, electric arc, etc.) to reach the glass transition point of the glass.

After cooling the fiber-metal substrate assembly and therefore the fiber-substrate-shape memory material assembly are solidly and strongly assembled. The fiber can carry a light energy necessary for the heating and consequently control of the memory material.

FIG. 6 shows two optical fibres 36, 38, each having an end surface 37, 39, which are to be contacted. These fibres can have a single core, e.g. can be monomode or multimode fibres. These fibres can be of the type used in optical communications. Multicore fibres or multifibres, which can be used in microendoscopy, are also appropriate. At the end of one of the two fibres is made a glass deposit 40 (FIG. 7A), e.g. by the aforementioned procedure (evaporation by bombardment by electron beam). The two fibres are then mutually positioned (FIG. 7B) and contacted, the glass layer 40 being at the interface between the surfaces 37, 39. The assembly is then heated (FIG. 7C), for example, by laser beam, electric arc or any other method making it possible to supply the heat necessary for reaching the glass transition point of the glass layer 40. After cooling, a solid joint is established between the two fibres without any deformation thereof. Here again, compared with other methods, heating by laser has the advantage of adaptability with respect to the various configurations possible. In arc welding a spacing allows the passage of the spark and the system cannot be assembled beforehand.

Figures 8, 9A:
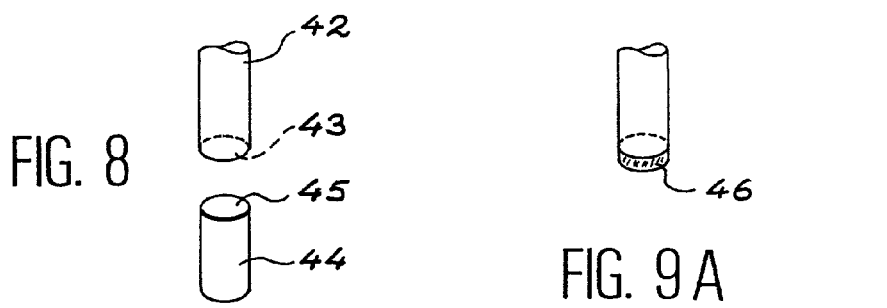
FIG. 8 A fiber and a lens to be assembled by a process according to the invention.
FIGS. 9A-9D Stages in the assembly of a fiber and a lens according to the invention.
Figures 9B, 9C, 9D:
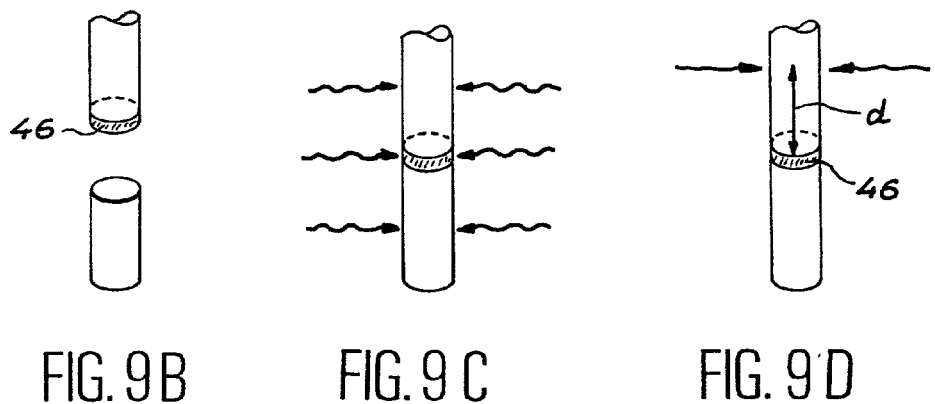

Another example relates to the assembly of an optical fiber 42 and a lens 44 (FIG. 8). The lens can in particular be a GRIN lens. The two elements are to be brought into contact by their end surfaces 43, 45. On one of the said surfaces is deposited a glass layer 46, e.g. by the procedure described hereinbefore (FIG. 9A). The two elements are then positioned facing one another (FIG. 9B). They are then mutually contacted, the layer 46 being located at the interface of the surfaces 43, 45 and the assembly is heated (FIG. 9C) with the aid of one of the aforementioned methods with their advantages and disadvantages. After cooling, a very strong lens-fiber joint is obtained with substantially no deformation of the lens or fiber.

This procedure is particularly advantageous in the case of lenses having characteristics differing greatly from those of the fibres. This is the case for lenses used in endoscopy, at the end of a multicore fiber. The glass transition point of these lenses is much lower than that of the multicore fibres and consequently the lenses soften much more rapidly than the fibres. In addition, the lenses do not withstand long heating periods, which would modify the thallium ion distribution and therefore the optical properties of the lens. Thus, a direct welding of the two elements, e.g. by $CO_2$ laser or electric arc leads to lens deformations. There is in particular a deterioration of the quality of the images. In addition, certain lenses are produced by the diffusion of cations into the material (such lenses and their composition are e.g. described in FR-2 004 043) and excessive temperatures modify the refractive indices and therefore the optical properties of the lenses. Such excessive temperatures are reached when there is a direct welding of the lens to the fiber. Consequently, in certain cases, it is appropriate to localize and displace the heating zone from the side of and in the direction of the less sensitive element to the supply of heat, e.g. from the side of the fiber in the case of a lens-fiber assembly or in the case of a substrate-fiber assembly. Thus, in FIG. 9D, the arrows 48 and 50 represent a localized heat supply on the side of the fiber 42, at a distance d from the fiber-lens or fiber-substrate interface and being e.g. between 90 and 170 μm. The fiber conducts the heat in the direction of the glass layer until the latter reaches its glass transition point. Thus, the supply of heat to the lens 44 or substrate is extremely limited. In such a case, the use of the glass layer limits the deformation of the elements. The indirect heating of the glass layer by means of the fiber 42 leads to no deterioration in the optical properties of the lens 44 or the substrate.

In general terms, it is preferable to use a glass layer with a glass transition point between e.g. 400 and 600° C. or between 400 and 500° C. (e.g. approximately 500° C.). Such a temperature range, which can be considered low for bringing about a glass transition of the glass, makes it possible to limit the heat supply to the optical component or components. A glass having this property can be constituted by silica doped with sodium and boron. It is e.g. a silica matrix doped with a $B_2O_3$—$Al_2O_3$—$Na_2O$—$K_2O$ mixture (for example: $SiO_2$: 78-83%; $B_2O_3$: 11-13%; $Al_2O_3$: 2-4%; $Na_2O$: 1-3%; $K_2O$: traces. An evaporated layer can have differences compared with this composition, because the different compounds do not evaporate with the same ease).

A glass having this composition has an expansion coefficient of $27.5 \cdot 10^{-7}$ (intermediate between that of a multicore fiber ($5 \cdot 10^{-7}$) and that of a lens ($10^{-5}$)), a glass transition point intermediate between 560 and 580° C. (for the lens) an optical attenuation of $4 \cdot 10^{-2}$ on the visible radiation range and for thicknesses of a few micrometers and a refractive index (1.4689) very close to that of an optical fiber.

The process according to the invention is suitable for the assembly of elements having relatively different refractive indices. This minimizes the Fresnel losses, the index of the intermediate glass layer being between the indices of the two elements to be welded. For example, for a fiber made from silica, the index of pure silica being approximately 1.46 and for a radial GRIN lens obtained by the diffusion of thallium ions with an index equal to or above 1.6, the layer can have an index of approximately 1.47.

The use of an evaporatable glass in place of a glass paste makes it possible to surmount the problems linked with the use of the latter material. A glass paste is difficult to dose due to the evaporation of the binder, which considerably modifies the volume thereof. In addition, said evaporation produces bubbles, which can be incorporated into the material. A glass paste can also undergo chemical deteriorations, which can render it inappropriate for use with an optical component. Finally the homogenization necessary for reducing diffusion implies a temperature rise up to 1000° C., which is unacceptable for a system using an optical component.

The invention is not limited to the assembly and splicing examples given hereinbefore. Two random optical components can be assembled by the procedure according to the invention. In particular, prism-lens assemblies can be achieved, a glass layer being deposited at the interface of the surfaces to be contacted. With two optical components assembled, they can be assembled with a third component. In this way an assembly of N components can be achieved, in which intermediate components (ports/windows, or spatial, spectral or interferometric filters, or polarizing layers) are located between two end components. For example, one or more windows can make it possible to adapt the distance between an optical fiber and a lens.

In addition, a glass layer can be deposited on the two surfaces to be contacted. This can be particularly interesting of the materials to be assembled differ very widely, with a glass layer on each of the materials, welding is much easier and of better quality. Finally, the surfaces to be contacted may or may not be planar.

The fact of using, according to the invention, a thin layer for producing the connection between two optical components, or between an optical component and a substrate, leads to the following advantages:

a precise presetting between the elements is possible, melting takes place at a low temperature (thus a thin layer melts at a lower temperature than material in macroscopic volume), deposition is very precisely controllable with respect to its optical quality, composition, thickness and adhesion, The optical importance of said intermediate layer is reduced and consequently the thin layer can be traversed by an optical beam without significantly disturbing the latter, stress overloads on the interfaces are avoided, because the thin material is more elastic.

Figure 10A:
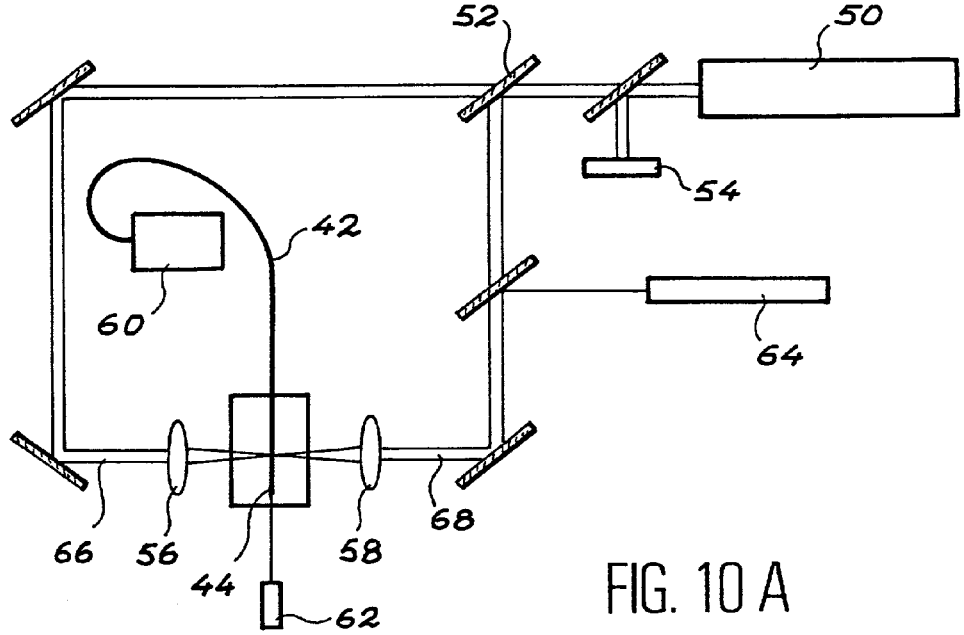
FIGS. 10A & 10B Respectively a device for producing a weld according to the invention and a device for controlling the end of a fiber.
Figure 10:
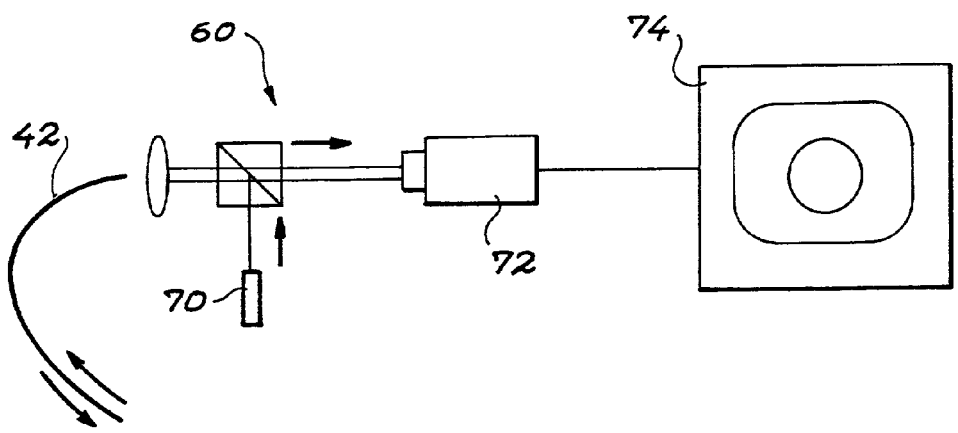

An example of an apparatus for producing the welding or fusion of two optical components, e.g. a fiber 42 and a lens 44 will now be described in conjunction with FIG. 10A. This apparatus uses a $CO_2$ laser 50. The laser beam is split into two by a semitransparent mirror 52. Part of the beam is previously sampled in the direction of a detector 54, in order to control the output power of the laser. A set of mirrors and lenses 56, 58 makes it possible to focus the two beams on the welding site, in order to obtain a local, homogeneous heating area. A mechanical xyz displacement system makes it possible to regulate the position between the lens and the multicore fiber. Once the system has been assembled, the lens-fiber contact area is placed in the laser beam. A thin evaporatable glass layer previously deposited on one of the surfaces to be contacted, ensures the fusion between the two elements.

Optical control systems or means 60, 62 can be used for bringing about a relative optical positioning of the components during the assembly stage, particularly for controlling the parallelism between the facing surfaces of the lens and the fiber (system 60) and/or the relative positioning (laser diode 62) between the fiber and the lens (centring) and/or between the fiber-lens system and the focused lenses (along an axis). Thus, the optical control means permit a possible correction of the relative position of the components during the actual welding stage. A helium-neon laser 64 makes it possible to control the positioning of the fiber-lens system relative to the focused beams (in accordance with the two other axes).

Such an optical control during the welding stage is impossible to carry out with either of the prior art procedures, these requiring a positioning before the welding stage, hence a less precise positioning.

The system 60 is represented in greater detail in FIG. 10B. Part of the beam of a laser diode 70 is injected into the fiber 42. The beam introduced into the fiber is reflected at the exit interface thereof and the entrance interface of the lens. These two reflected signals interfere in order to form an interference pattern having interference lines, detected by a CCD camera 72. The distance between the lines and the orientation of these lines makes it possible to control the relative orientation of the two faces to be contacted. The interference pattern can be displayed on a display means 74. This approach can be generalized to all surface forms or shapes, because this system simply measures the distance between these two surfaces. This procedure also makes it possible to rapidly evaluate whether the interfaces are planar or whether they have faults. It also permits the real time tracking of the evolution of the weld.

The laser beam emitted by the laser diode 62 forms a light spot on the rear face of the lens, by focusing. This light spot can be centred by direct observation through the multicore fiber 42, camera 72 and display 74.

Figure 11:
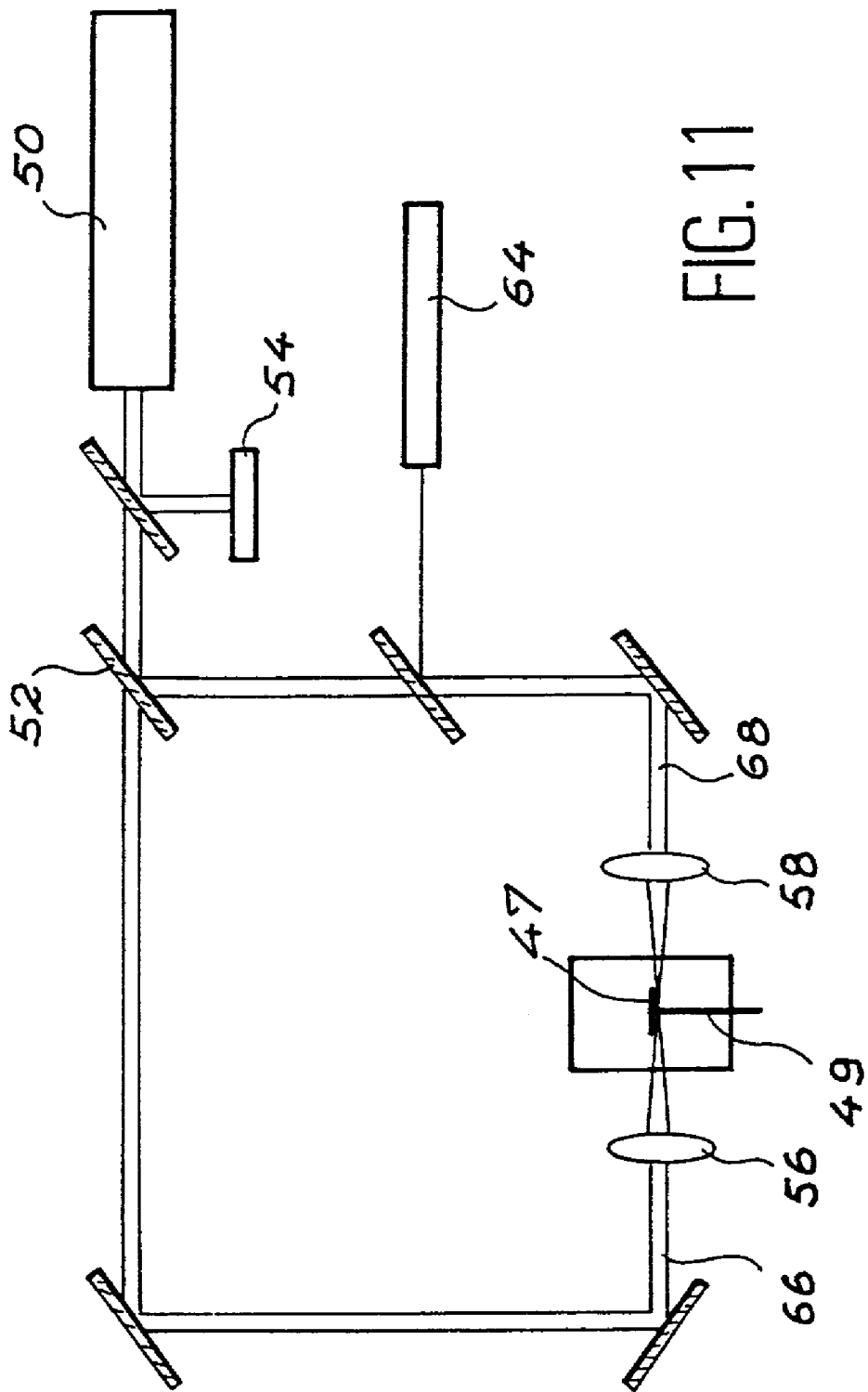
FIG. 11 Another device for producing a weld according to the invention.

An example of a device for producing the weld of an optical component, e.g. a fiber 49 and a substrate 47, will be described in conjunction with FIG. 11, where numerical references identical to those of FIG. 10A designate identical or corresponding elements. The beam of the $CO_2$ laser 50 is subdivided into two by a semitransparent mirror 52. Part of the beam is previously sampled in the direction of the detector 54, in order to check the discharge power of the laser. A set of mirrors and lens 56, 58 makes it possible to focus the two beams on the weld site, in order to obtain a local, homogeneous heating area. A mechanical displacement system xyz makes it possible to regulate the position between the fiber and the substrate. Once the system has been assembled, the substrate-fiber contact area is placed in the laser beam. A thin glass layer previously deposited on one of the surfaces to be contacted ensures the welding between the two elements.

An assembly between a GRIN lens and a multicore fiber can be used in a microendoscopy device. The operating principle of such a device has been described in the introduction to the present application in conjunction with FIG. 1. Such a device essentially incorporates a multicore fiber 12, a lens 20 connected to said fiber and means 2, 8 and 10 for illuminating an area 16 to be observed, it also being possible to provide in combination with said device means for storing, analyzing and/or representing an image of the area 16. The operating principles of this device are also described in the articles by A. Katzir referred to hereinbefore. A multicore fiber-lens assembly obtained by a process according to the invention makes it possible to produce better quality endoscopic images, more particularly due to the absence of deformation to the lenses and the multicore fiber.

The structure of a multicore fiber will be described in conjunction with FIGS. 12A and 12B. A multicore fiber is a fiber bundle, in melted and drawn form, which consequently forms a continuous assembly. The coatings of each individual fiber melt with the coatings of adjacent cores. Within a multicore fiber only individual cores can be distinguished and the coating of the fibres has to a certain extent become collective.

Figure 12:
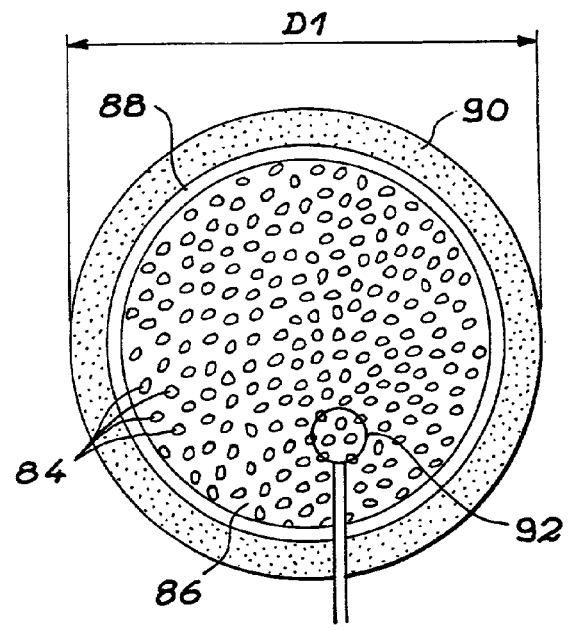
FIGS. 12A & Cross-sectional views of a multicore optical fiber. 12B
Figure 12:
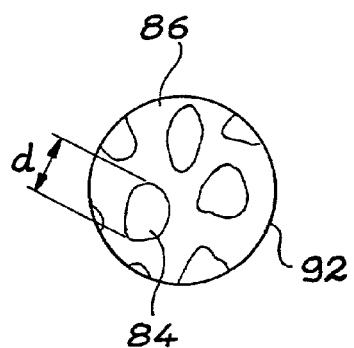

FIG. 12A is a cross-sectional view of a multicore fiber, the cores 84 and coatings 86 being grouped within a first sheath 88, e.g. of silica, and a second sheath 90, called the outer sheath or "black" covering. The external diameter $D_1$ of the assembly can e.g. be approximately 200 to 500 µm.

FIG. 12B is a larger scale view of the core bundle portion 92. FIG. 12B shows that the cores have more or less homogeneous, variably shaped cross-sections. In particular, the diameter d of each core, i.e. the greatest distance separating two points of the same core, varies between the individual cores. Typically, d varies e.g. between 3 and 4 µm for the same multicore fiber. In the same way, the mean distance between individual cores is not uniform and can e.g. vary for the same multicore fiber between 3 and 3.5 µm.

The thickness of the glass layer is smaller or of the same order of magnitude as the diameter or characteristic dimensions of the cores of the multicore fiber, so that there is a reduction in the light diffraction problems at the multicore fiber-optical component interface.

In the case of the application to an imaging device and in particular an endoscope, this makes it possible to retain a high spatial resolution.

In the case of a multicore fiber, the possible deformations due to direct welding between the fiber and another element, particularly a lens, are not compatible with the use of the fiber in the imaging field. Moreover, the deformations more particularly affect peripheral cores and are therefore inhomogeneous on the complete core assembly. Thus, this aspect concerning deformations is more prejudicial in this type of fiber than in fibres having a single core. In fibres having a single core, only the central portion of the core, which only represents a minute portion of the lateral surface, has to be little or not deformed with the conventional processes.

Moreover, the intermediate glass layer is much less sensitive to water vapour and the sterilization pressures and temperatures (approximately 134° C. in the humid heat of the autoclave) than the conventionally used adhesives. This better resistance to sterilization and water vapour or steam leads to a longer life of the endoscope and therefore to a reduction of costs corresponding to the use of such equipment.

The use of a lead-free glass for producing the connection between two optical components makes it possible, in the case of a multicore fiber-lens connection, to avoid any problem of colouring of the optical signal traversing the glass layer. Thus, a positioning of the endoscope in the body is often brought about with the aid of X-rays, simultaneously with the actual endoscopic visual display.

Finally, the weld produced according to the invention, i.e. using a thin layer, leads to the following property. The thin layer mainly reacts, during the formation of the bond with the fibres, with the cores present in the multicore fiber and which are doped with germanium. This element makes it possible to lower the glass transition point as a direct function of the concentration. As the cores are of the index gradient or GRIN type, attachments are created at the centre of the cores and then propagate to the periphery, the connection being less strong with the inter-core areas, which are little or not doped with elements favourable for welding of the germanium type.

This property remains valid for numerous optical components in which a germanium doping is introduced. It is in particular the case for single, monomode or multimode optical fibres. Thus, the invention applies to fibres having varied compositions, e.g. based on silica melted with a core doped with germanium and optionally fluorine, or based on fluorine glass, or based on silver chalcogenide, or sapphire or "Tex" glass.

In the case of a bond between a multicore fiber and a Selfoc or GRIN lens, the alkaline ions contained in the glass layer (silica) diffuse from the two sides in the direction of the fiber and the lens. The cores of the fibres of the multicore fiber have a melting point lower than that of silica and there is a diffusion towards the multicore fiber cores. On the side of the lens, there is an interdiffusion phenomenon, the thallium ions of the lens diffuse towards the glass layer and the alkaline ions diffuse from the glass layer towards the lens.

Thus, the bond established is an ion exchange bond and the wettability of the surfaces by the material constituting the glass layer is consequently unnecessary.

Thus, the invention makes it possible to bring about the lens-fiber connection or bond of an endoscope. This connection has the afore-mentioned properties of moisture resistance and resistance to the sterilization pressures and temperatures. In general terms, the invention covers any lens-fiber connection compatible both with a use in endoscopy and having said moisture resistance and sterilization temperature resistance.

The invention claimed is:

1. An optical assembly comprising:
a multicore optical fiber,
a substrate, and
a thin glass layer in contact with said multicore optical fiber and said substrate, said thin glass layer being located at an interface between the multicore optical fiber and the substrate, wherein
said thin glass layer adjusts to surfaces of an end face of the multicore optical fiber and the substrate to form an optical connection between the multicore optical fiber and the substrate, and
wherein said thin glass layer has a thickness between 1 µm and 5 µm.

2. The optical assembly according to claim 1, the substrate being a member of the group consisting of glass, a metal, a semiconductor, a plastic, a shape memory material.

3. The assembly according to claim 1, wherein the glass has a glass transition point between 400 and 500° C.

4. The assembly according to claim 1, wherein the glass has a silica matrix doped with a $B_2O_3$—$Al_2O_3$—$Na_2O$—$K_2O$ mixture.

5. The assembly according to claim 4, wherein said thin glass layer comprises 78-83% of $SiO_2$.

6. The assembly according to claim 5, wherein said thin glass layer comprises 11-13% of $B_2O_3$.

7. The assembly according to claim 6, wherein said thin glass layer comprises 2-4% of $Al_2O_3$.

8. The assembly according to claim 7, wherein said thin glass layer comprises 1-3% of $Na_2O$.

9. The assembly according to claim 1, wherein the glass is an evaporable glass.

10. The assembly according to claim 1, wherein said thin glass layer is configured to weld said multicore optical fiber to said substrate.

11. The assembly according to claim 1, wherein said thin glass layer is deposited by at least one of a plasma pulse, an evaporation by electron beam bombarding, or a spin-on-glass method.

12. The assembly according to claim 1, wherein said thin glass layer has an expansion coefficient intermediate between a substrate expansion coefficient of said substrate and a component expansion coefficient of said multicore optical fiber.

13. The assembly according to claim 1, wherein said thin glass layer is free of lead.

14. The assembly according to claim 1, wherein said thin glass layer has a lower glass transition point than a melting point of a same glass material in a macroscopic volume.

15. The assembly according to claim 1, wherein said optical assembly is an endoscope.

16. The assembly according to claim 1, wherein said optical assembly is a medical device.

17. The assembly according to claim 1, wherein said optical assembly is an image guide.

18. The optical assembly according to claim 1, wherein the optical connection provided by the thin glass layer is configured to retain a spatial resolution of an endoscopic image provided by the multicore optical fiber or the substrate.

19. The optical assembly according to claim 1, wherein a thickness of the thin glass layer is smaller than a diameter of an individual fiber of the multicore optical fiber.

20. An optical assembly comprising:
a multicore optical fiber,
a optical component, and
a thin glass layer in contact with said multicore optical fiber and said optical component, said thin glass layer being located at an interface between the multicore optical fiber and the optical component, wherein
said thin glass layer adjusts to surfaces of an end face of the multicore optical fiber and the optical component, and
wherein a thickness of the thin glass layer is smaller than a diameter of and individual fiber of the multicore optical fiber.

21. The assembly according to claim 20, wherein the optical component is one of a lens and a prism.

22. The assembly according to claim 20, wherein the optical component is an optical fiber having one of a single core and a multicore.

23. The assembly according to claim 20, wherein the optical component is a microlens.

24. The assembly according to claim 23, wherein the microlens is a GRIN microlens.

25. The assembly according to claim 20, wherein said thin glass layer is configured to weld said multicore optical fiber to said optical component.

26. The assembly according to claim 20, wherein said thin glass layer is deposited by at least one of a plasma pulse, an evaporation by electron beam bombarding, or a spin-on-glass method.

27. The assembly according to claim 20, wherein the glass has a glass transition point between 400 and 500° C.

28. The assembly according to claim 20, wherein the glass has a silica matrix doped with a $B_2O_3$—$Al_2O_3$—$Na_2O$—$K_2O$ mixture.

29. The assembly according to claim 28, wherein said thin glass layer comprises 78-83% of $SiO_2$.

30. The assembly according to claim 29, wherein said thin glass layer comprises 11-13% of $B_2O_3$.

31. The assembly according to claim 30, wherein said thin glass layer comprises 2-4% $Al_2O_3$.

32. The assembly according to claim 31, wherein said thin glass layer comprises 1-3% of $Na_2O$.

33. The assembly according to claim 20, wherein the glass is an evaporable glass.

34. The assembly according to claim 20, wherein said thin glass layer has an expansion coefficient intermediate between a first expansion coefficient of said multicore optical fiber and a second expansion coefficient of said optical component.

35. The assembly according to claim 20, wherein said thin glass layer is free of lead.

36. The assembly according to claim 20, wherein said thin glass layer has a lower glass transition point than a melting point of a same glass material in a macroscopic volume.

37. The assembly according to claim 20, wherein said thin glass layer has a refractive index between a first refractive index for said multicore optical fiber and a second refractive index for said optical component.

38. The assembly according to claim 37, wherein said refractive index for said thin glass layer is approximately 1.47.

39. The assembly according to claim 20, wherein said optical assembly is an endoscope.

40. The assembly according to claim 20, wherein said optical assembly is a medical device.

41. The assembly according to claim 20, wherein said optical assembly is an image guide.

42. The optical assembly according to claim 20, wherein the optical connection provided by the thin glass layer is configured to retain a spatial resolution of an endoscopic image provided by the multicore optical fiber or the optical component.

43. The assembly according to claim 20, wherein said thin glass layer has a thickness between 1 μm and 5 μm.

44. An optical assembly comprising:
   means for guiding an image,
   a substrate, and
   a thin glass layer in contact with said means for guiding an image and said substrate, said thin glass layer being located at an interface between the means for guiding an image and the substrate, wherein
   said thin glass layer adjusts to surfaces of the means for guiding an image and the substrate to form an optical connection between the means for guiding an image and the substrate, and
   wherein a thickness of the thin glass layer is smaller than a diameter of an individual fiber of the means for guiding an image.

45. The optical assembly according to claim 44, wherein said means for guiding an image includes at least one of a multifiber, multimode fibers or fiber bundles.

46. The optical assembly according to claim 44, wherein the optical connection provided by the thin glass layer is configured to retain a spatial resolution of an endoscopic image provided by the means for guiding an image or the substrate.

* * * * *

UNITED STATES PATENT AND TRADEMARK OFFICE
CERTIFICATE OF CORRECTION

| | |
|---|---|
| PATENT NO. | : 7,302,142 B2 |
| APPLICATION NO. | : 10/123176 |
| DATED | : November 27, 2007 |
| INVENTOR(S) | : Ramiro Conde and Christian Depeursinge |

It is certified that error appears in the above-identified patent and that said Letters Patent is hereby corrected as shown below:

Column 7, line 4, "Fig. 3A fiber and substrate to be spliced." should read --Fig. 3 A fiber and substrate to be spliced.--.

Column 14, line 42, after "component" insert --to form an optical connection between the multicore optical fiber and the optical component--.

Column 14, line 45, "and" should read --an--.

Signed and Sealed this

Eighteenth Day of November, 2008

JON W. DUDAS
*Director of the United States Patent and Trademark Office*